(12) United States Patent
Panicacci et al.

(10) Patent No.: US 9,848,141 B2
(45) Date of Patent: Dec. 19, 2017

(54) IMAGE PIXELS HAVING PROCESSED SIGNAL STORAGE CAPABILITIES

(71) Applicant: SEMICONDUCTOR COMPONENTS INDUSTRIES, LLC, Phoenix, AZ (US)

(72) Inventors: Roger Panicacci, Los Angeles, CA (US); Marko Mlinar, Horjul (SI)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/151,078

(22) Filed: May 10, 2016

(65) Prior Publication Data

US 2017/0332023 A1 Nov. 16, 2017

(51) Int. Cl.
| | |
|---|---|
| H04N 5/359 | (2011.01) |
| H04N 5/378 | (2011.01) |
| H04N 5/374 | (2011.01) |
| H04N 9/04 | (2006.01) |

(52) U.S. Cl.
CPC ........... H04N 5/3592 (2013.01); H04N 5/378 (2013.01); H04N 9/045 (2013.01); H04N 2209/045 (2013.01)

(58) Field of Classification Search
CPC .... H04N 5/3592; H04N 5/378; H04N 5/3745; H04N 9/045; H04N 2209/045
USPC .... 348/250, 300–310, 657, 697, 294, 222.1; 250/208.1, 370.14; 257/191, 192, 204, 257/238, E27.046, 291, 292; 330/278, 330/279, 182, 282; 345/505, 506, 557
See application file for complete search history.

(56) References Cited

U.S. PATENT DOCUMENTS

| | | | |
|---|---|---|---|
| 6,326,230 B1 * | 12/2001 | Pain | H01L 27/14609 257/223 |
| 6,977,685 B1 * | 12/2005 | Acosta-Serafini | H04N 5/2355 348/297 |
| 7,514,716 B2 | 4/2009 | Panicacci | |
| 7,936,388 B2 | 5/2011 | Koifman et al. | |
| 8,184,173 B1 * | 5/2012 | Koifman | H04N 5/35527 348/222.1 |
| 8,736,726 B2 | 5/2014 | Panicacci | |

(Continued)

*Primary Examiner* — Lin Ye
*Assistant Examiner* — Marly Camargo
(74) *Attorney, Agent, or Firm* — Treyz Law Group, P.C.; Tianyi He

(57) ABSTRACT

An image sensor may include an array of image sensor pixels. Each image sensor pixel may have signal storage capabilities implemented through a write-back supply line and a control transistor for the supply line. Each image sensor pixel may output pixel values over column lines to switching circuitry. The switching circuitry may route the pixel values to signal processing circuitry. The signal processing circuitry may perform analog and/or digital processing operations utilizing analog circuits or pinned diode devices for image signal processing on the pixel values to output processed pixel values. The processing circuitry may send the processed pixel values back to the array. This allows the array to act as memory circuitry to support processing operations on processing circuitry in close proximity to the array. Configured this way, signal processing can be performed in close proximity to the array without having to move pixel signals to peripheral processing circuitry.

18 Claims, 11 Drawing Sheets

(56) References Cited

U.S. PATENT DOCUMENTS

| | | | | |
|---|---|---|---|---|
| 9,153,010 B2* | 10/2015 | Tezuka | ............... | H04N 1/40068 |
| 2007/0189604 A1* | 8/2007 | Baron | .................... | H04N 3/155 |
| | | | | 382/167 |
| 2009/0072120 A1* | 3/2009 | McGarry | ............. | H04N 5/2353 |
| | | | | 250/208.1 |
| 2009/0109311 A1* | 4/2009 | Mabuchi | ................ | H04N 3/155 |
| | | | | 348/302 |
| 2010/0088475 A1* | 4/2010 | Alba Pinto | ......... | G06F 12/0207 |
| | | | | 711/149 |
| 2015/0317763 A1* | 11/2015 | Mather | ................. | G06T 15/005 |
| | | | | 345/506 |
| 2016/0267686 A1* | 9/2016 | Ohta | .......................... | G06T 7/11 |
| 2017/0076431 A1* | 3/2017 | Dai | ......................... | G06T 5/002 |

* cited by examiner

IMAGE PIXELS HAVING PROCESSED SIGNAL STORAGE CAPABILITIES

BACKGROUND

This relates generally to image sensors and, more specifically, to image sensors having image pixels with processed signal storage capabilities.

Image sensors are commonly used in electronic devices such as cellular telephones, cameras, and computers to capture images. Conventional image sensors are fabricated on a semiconductor substrate using complementary metal-oxide-semiconductor (CMOS) technology or charge-coupled device (CCD) technology. The image sensors may include an array of image sensor pixels each of which includes a photodiode and other operational circuitry such as transistors formed in the substrate. The image sensor pixels generate image signals in response to image light. Readout circuitry reads out the image signals from the image sensor pixels.

The image sensors often include processing circuitry coupled to the readout circuitry. The processing circuitry is located around the periphery of the array of image sensor pixels. The processing circuitry performs image processing operations on the read out image signals. The processing circuitry includes memory for storing the processed image signals. The processed image signals are conveyed to frame memory external to the image sensor for storage. The processed image signals stored on the frame memory are further processed by the processing circuitry on the image sensor or by other processing circuitry.

Storing the processed image data on external frame memory can result in undesirably slow processing time, can consume excessive power, and can increase the manufacturing cost and complexity of the imaging system.

It would therefore be desirable to be able to provide image sensors with improved image signal processing and storage capabilities.

DETAILED DESCRIPTION

Embodiments of the present invention relate to image sensors, and more particularly, to image sensors having image pixels with storage capabilities and on-chip processing circuitry. It will be recognized by one skilled in the art, that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices include image sensors that gather incoming light to capture an image. The image sensors may include arrays of imaging pixels. The pixels in the image sensors may include photosensitive elements such as photodiodes that convert the incoming light into image signals. Image sensors may have any number of pixels (e.g., hundreds or thousands of pixels or more). A typical image sensor may, for example, have hundreds of thousands or millions of pixels (e.g., megapixels). Image sensors may include control circuitry such as circuitry for operating the imaging pixels and readout circuitry for reading out image signals corresponding to the electric charge generated by the photosensitive elements.

Figure 1:
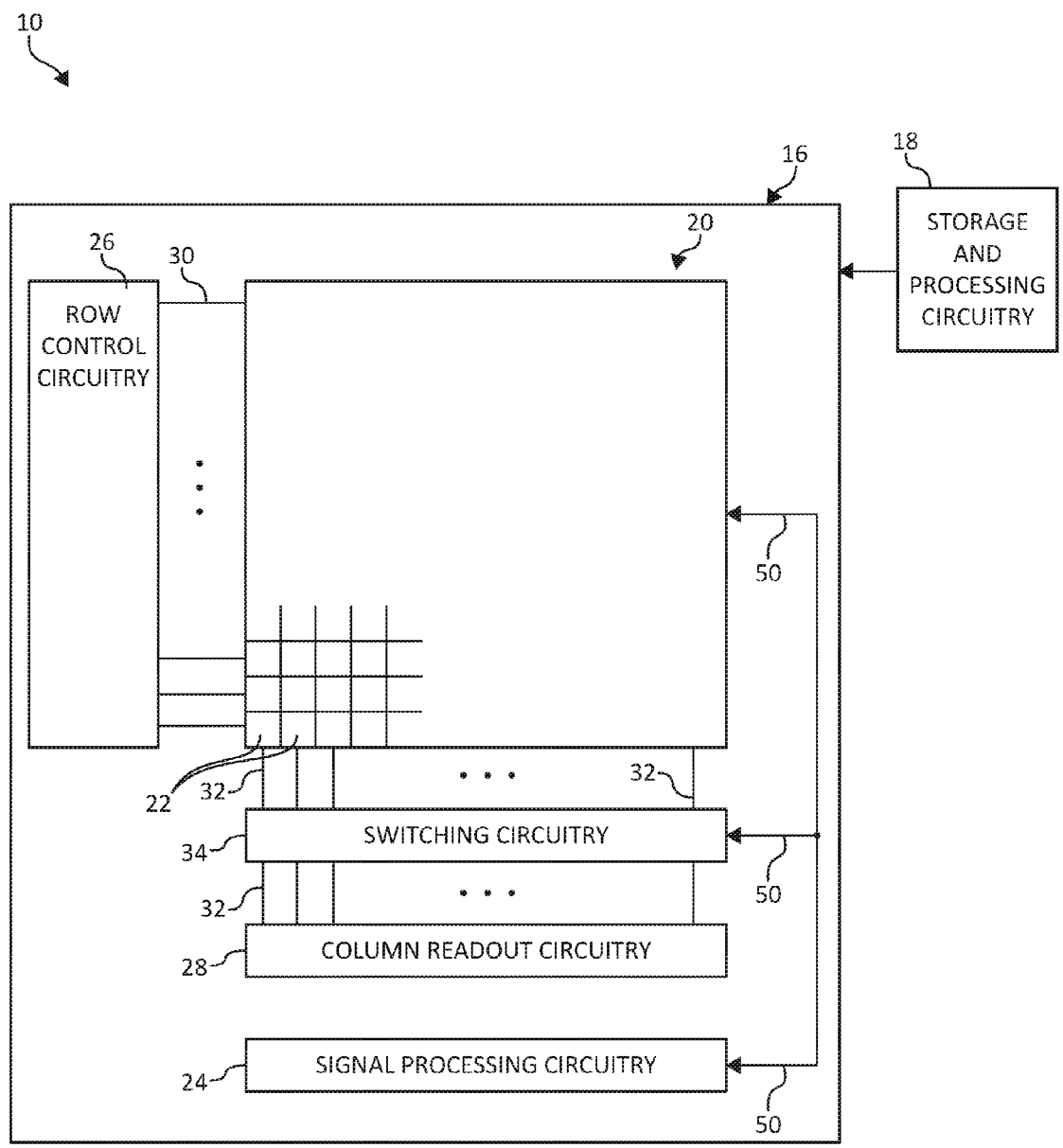
FIG. 1 is a diagram of an illustrative imaging system having image pixels with processed signal storage capabilities in accordance with an embodiment.

FIG. 1 is a diagram of an illustrative imaging system such as an electronic device that uses an image sensor to capture images. Imaging system 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. A camera module may be used to convert incoming light into digital image data. The camera module may include one or more lenses and one or more corresponding image sensors 16. The lenses may include fixed and/or adjustable lenses and may include microlenses formed on an imaging surface of image sensor 16. During image capture operations, light from a scene may be focused onto image sensor 16 by the lenses. Image sensor 16 may include circuitry for converting analog pixel value into corresponding digital image data to be provided to storage and processing circuitry 18. If desired, the camera module may be provided with an array of lenses and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from the camera module and/or that form part of the camera module (e.g., circuits that form part of an integrated circuit that includes image sensors 16 or an integrated circuit within the module that is associated with image sensors 16). When storage and processing circuitry 18 is included on different integrated circuits (e.g., chips) than those of image sensors 16, the integrated circuits with circuitry 18 may be vertically stacked or packaged with respect to the integrated circuits with image sensors 16. Image data that has been captured by the camera module may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Image sensor 16 may include a pixel array 20 containing image sensor pixels 22 arranged in rows and columns (sometimes referred to herein as image pixels or pixels) and signal processing circuitry 24. Signal processing circuitry 24 may contain, for, example, analog and/or digital circuitry (e.g., integrators, comparators, registers). Array 20 may contain, for example, hundreds or thousands of rows and columns of image sensor pixels 22. Row control circuitry 26 may receive row addresses from a control circuitry (not shown) and may supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32. The example of FIG. 1 in which column lines and row lines are coupled to pixels 22 are merely illustrative. If desired, lines 30 and/or 32 may be coupled to any desired block of pixels 22 in array 20.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. The ADC circuitry in readout circuitry 28 may convert analog pixel values received from array 20 into corresponding digital pixel values (sometimes referred to as digital image data or digital pixel data). Image readout circuitry 28 may supply digital pixel data to the control circuitry and/or processor 18 for pixels in one or more pixel columns.

Signal processing circuitry 24 on image sensor 16 may be coupled to switching circuitry 34 and pixels 22 in array 20 over communications path 50. Switching circuitry 34 may be interposed on column lines 32 between column readout circuitry 28 (sometimes referred to as column control circuitry, readout circuitry, processing circuitry, or column decoder circuitry) and array 20. Each column line 32 may be coupled to a corresponding column of pixels 22 in array 20. Switching circuitry 34 may include respective switches for each column line 32 to convey signals read out from pixels 22 to a selected one of column readout circuitry 28 and signal processing circuitry 24. If desired, switching circuitry 34 may selectively couple a subset of the columns of array 20 to signal processing circuitry 24 while coupling the remaining columns of array 20 to readout circuitry 28.

Row control circuitry 26, array 20, switching circuitry 34, column readout circuitry 28 and/or signal processing circuitry 24 may all be formed on the same integrated circuit (chip). Processing circuitry 24 may therefore be referred to sometimes herein as on-chip processing circuitry 24. If desired, image sensor 16 may include an integrated circuit package or other structure in which multiple integrated circuit substrate layers or chips are vertically stacked with respect to each other. In this scenario, one or more of circuitry 34, 26, 28, and 24 may be vertically stacked below array 20 within image sensor 16. If desired, lines 32, 30, and/or 50 may be formed from vertical conductive via structures and/or horizontal interconnect lines in this scenario.

If desired, image pixels 22 may include one or more photosensitive regions for generating charge in response to image light. Photosensitive regions within image pixels 22 may be arranged in rows and columns on array 20. Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.).

Image pixels 22 may have processed signal storage capabilities. If desired, signal processing circuitry 24 may receive pixel values (e.g., image-level signals or reset-level signals) from pixels 22. Signal processing circuitry 24 may perform analog and/or digital processing operations on the received pixel values to generate analog and/or digital processed pixel values. In order to perform image processing operations, signal processing circuitry 24 may store the pixel values and/or the processed pixel values on storage circuitry (memory). In some scenarios, the processed pixel values are transmitted to off-chip memory (e.g., frame memory on storage and processing circuitry 18) for storage. The processed pixel values may be transmitted from memory on circuitry 18 back to processing circuitry 24 for further processing in this example. In other scenarios, the processed pixel values may be further processed on circuitry 18 or transmitted to other circuitry.

Transmitting the processed pixel values to off-chip memory on circuitry 18 may occupy an excessive amount of time and can increase the manufacturing cost and complexity of system 10. This may be particularly undesirable for processing operations that require relatively fast processing times such as object detection operations. Additionally, transmission of the processed pixel values across interfaces (e.g., across connections between different integrated circuit chips) consumes more power compared to transmission and processing within a same integrated circuit chip. Thus it may be beneficial to process pixel values using signal processing circuitry 24 to reduce bandwidth and lower power consumption.

If desired, signal processing circuitry 24 may utilize the charge storage capabilities of pixels 22 for storage of the processed pixel values. For example, signal processing circuitry 24 may transmit processed pixel values to array 20 over communications path 50 (sometimes referred to as communications bus 50, communications lines 50, or pixel processing bus 50). Communications path 50 may include one or more communications lines. The communications lines in path 50 may include conductive traces, wires, contact structures, vertical conductive vias, transmission line structures, or other desired communications paths. If desired, switching circuitry 34 may selectively route pixel values from a different columns of pixels 22 to circuitry 28 and 24. For example, switching circuitry 34 may selectively activate and deactivate switches coupled to column lines 32 to route the pixel values to circuitry 28 or circuitry 24 for each column of pixels 22.

If desired, processing circuitry 24 may transmit processed pixel values to unused pixels 22 or dark areas of an image in array 20 for storage over paths 50. In one suitable arrangement, the same pixel values may be stored on multiple different pixels 22 across array 20 (e.g., for redundancy). Active portions of array 20 (e.g., pixels not being used to store processed pixel values generated by processing circuitry 24) may generate image and reset level pixel values. In this way, array 20 may store processed pixel values and generate new pixel values simultaneously, for example. In another suitable arrangement, processed pixel values may be stored on pixels 22 that are already being used to store processed pixel values (e.g., to superimpose the two pixel values) or may be stored on pixels 22 that are generating new pixel values.

Pixel values may be stored in any desired part of pixel 22 (e.g., photosensitive region, floating diffusion node, etc.). Processing, storage and export steps may be fast enough to not allow lighting conditions to corrupt the stored data. In some conditions, however, light shielding structures (e.g., mechanical shutter, buried light shields, etc.) may be used to temporarily or permanently prevent incoming light signals from corrupting the stored processed pixel values.

Figure 2:
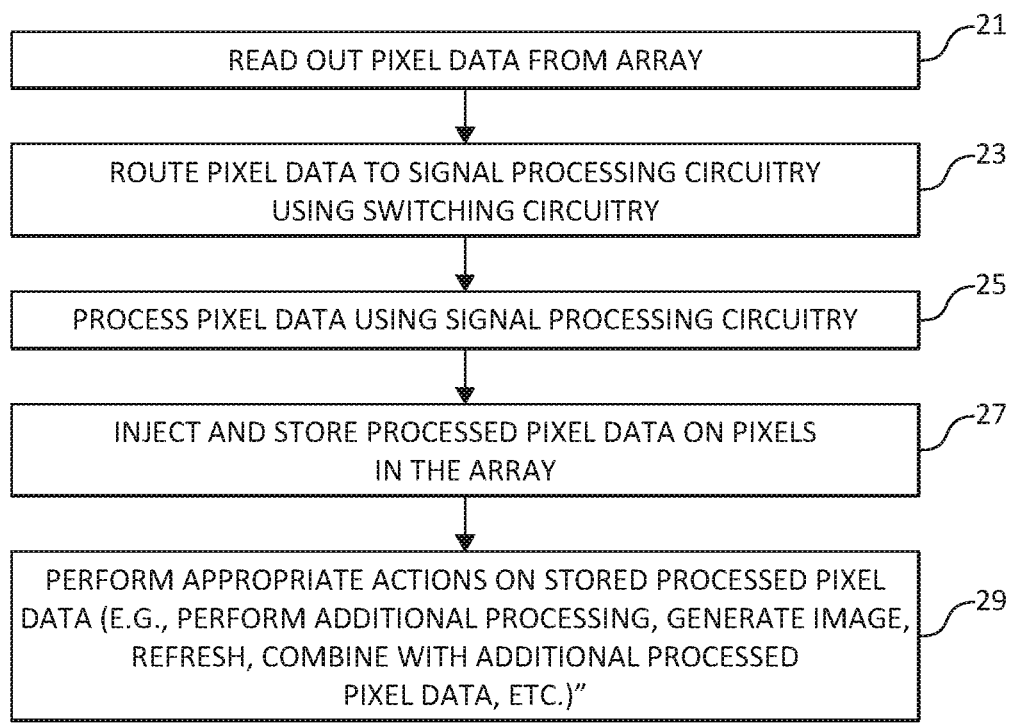
FIG. 2 is a flow chart of illustrative steps that may be performed by an image sensor to store processed pixel signals on image pixels in accordance with an embodiment.

FIG. 2 is a flow chart of illustrative steps that may be performed by image sensor 16 to store processed pixel values on pixels 22. The steps of FIG. 2 may, for example, be performed after pixels 22 have generated pixel values (e.g., reset-level pixel values or image-level pixel values generated in response to image light).

At step 21, pixel values may be read out from pixels 22 over column lines 32. The pixel values may be read out from each of the columns or from a subset of the columns of array 20. The read out pixel values may be routed to signal processing circuitry 24 and/or readout circuitry 28 (e.g., based on the configuration of switching circuitry 34).

At step 23, switching circuitry 34 may route pixel values from a selected number of column lines 32 (e.g., some or all of column lines 32) to signal processing circuitry 24 over path 50. As an example, during low frame rate operation or when image sensor is in a standby mode and not receiving light signals, some pixels in array 20 have charge storage capacity. These pixels 22 may often be for storing processed pixel values.

At step 25, signal processing circuitry 24 may perform analog and/or digital processing operations on the pixel values. Processing operations performed by signal processing circuitry 24 may include integration operations, weighted subtraction operations, weighted addition operations, comparison operations, analog-to-digital conversion operations, digital-to-analog conversion operations, storage operations, accumulation operations, multiplication operations, division operations, transformation operations, or any other desired processing operations. The processing operations performed by circuitry 24 may be form a part of higher-level processing functions such as object detection operations, edge detection operations, motion detection operations, color transformation operations, white balance operations, gamma correction operations, high-dynamic-range (HDR) imaging operations, noise correction operations, focusing operations, face detection operations, light source flicker mitigation operations, or any other desired higher-level processing operations. Processing circuitry 24 may generate corresponding processed pixel values by performing the desired image processing operations. The processed pixel values may be output to other processing circuitry or may be output as a final image.

When performing many processing operations, the processed pixel values need to be stored for additional processing at a later time. For example, when performing motion detection operations, a pixel value may be stored for comparison to a subsequently captured pixel value to identify moving objects in the imaged scene.

At step 27, processing circuitry 24 may transmit (inject) processed pixels onto one or more pixels 22 in array 20 over path 50 for storage.

At step 29, signal processing circuitry 24 may perform appropriate actions on the processed pixel values stored on pixels 22. As an example, the stored processed pixel values may be read out from the pixels 22 on which they are stored and may be conveyed to circuitry 24 and/or circuitry 28 for additional processing. In another suitable arrangement, additional processed pixel values may replace the stored processed pixel values on pixels 22 or may be added to the stored processed pixel values on pixels 22 (e.g., by superimposing the pixel values on pixels 22). In yet another suitable arrangement, the stored processed pixel values may be periodically refreshed. The example of FIG. 2 is merely illustrative. If desired, some steps may be omitted or replaced with alternate methods with accompanying hardware to serve the purposes shown in FIG. 2 (e.g., pixel values from numerous arrays, skipping processing before storage, injecting pixel values into multiple arrays).

Figure 3:
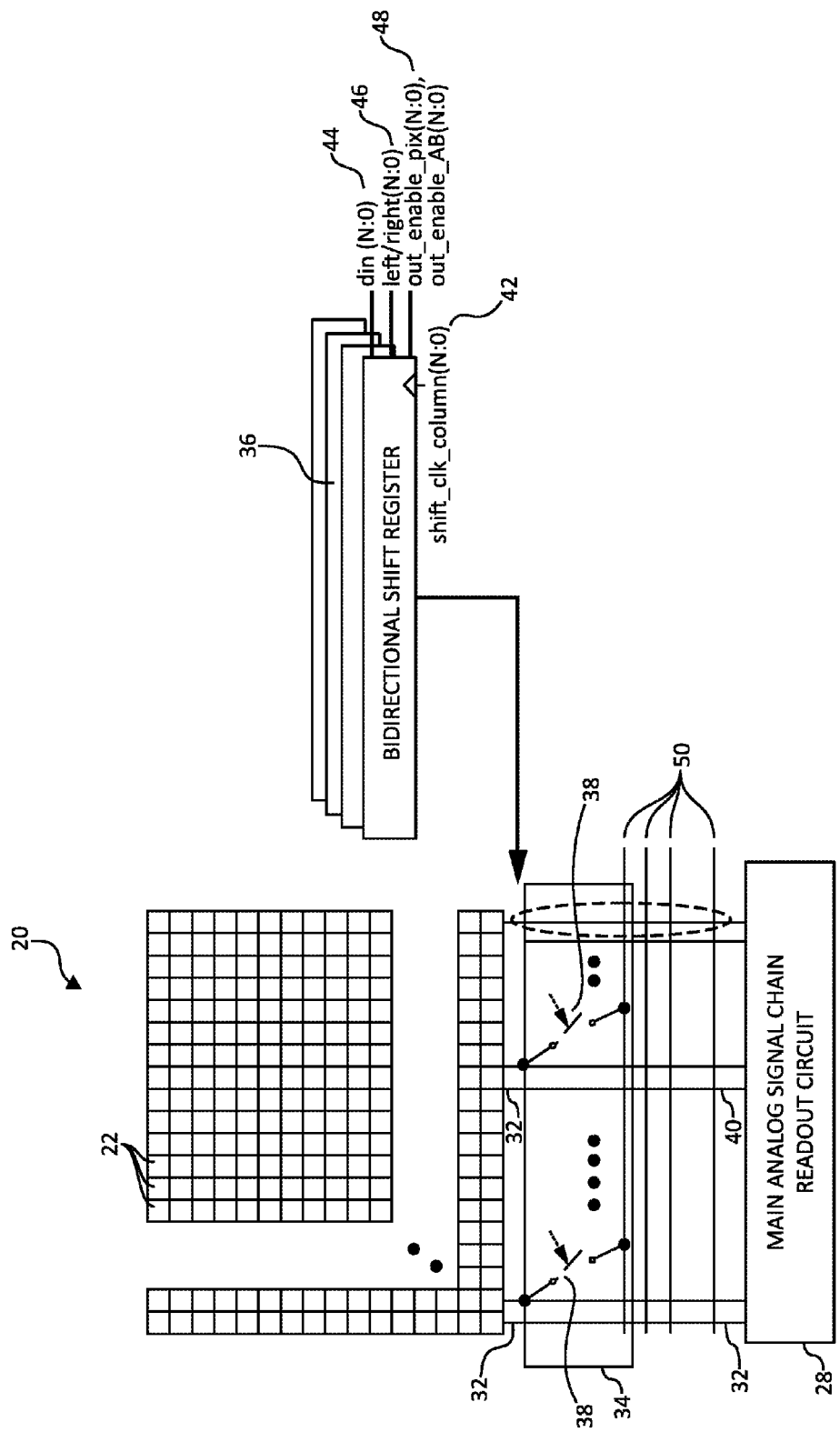
FIG. 3 is a diagram of an illustrative pixel array and associated control circuitry for reading out pixel values from image pixels along column lines in accordance with an embodiment.

FIG. 3 is a diagram showing how switching circuitry 34 may selectively route pixels 22 to signal processing circuitry 24. As shown in FIG. 3, column lines 32 may form connections between columns of array 20 and column readout circuitry 28. Switching circuitry 34 may include a number of switches 38 each interposed on a respective column lines 32. The switches may selectively couple column lines 32 to a corresponding intersecting conductive line 50 (e.g., to a corresponding conductive line of bus 50). Bidirectional shift register 36 may have input control signals 44 with input din, 46 with input left/right, and 48 with input out_enable_pix and out_enable_AB, and clock signal 42 with input shift_clk_column. Inputs 44, 46, 48, and 42 may have separate inputs corresponding to every column. Shift register 36 may control switches 38 based on control signals 44, 46, 48, and 42 (e.g., to control which of column lines 32 are coupled to signal processing circuitry 24 over bus 50 instead of to readout circuitry 28). In the example of FIG. 3, switches 38 may be activated (closed) to couple pixels 22 to circuitry 24. In another suitable arrangement, pixels 22 may be coupled to circuitry 28 when switches 38 are activated. If desired, switching circuitry 34 may also include additional switches (not shown) that control pixel value flow to readout circuitry 28. In this way, if desired, pixel values may be transmitted to one or both of readout circuitry 28 and processing circuitry 24.

In another suitable arrangement, switching circuitry 34 may selectively couple column lines from dedicated rows in array 20 to signal processing circuitry 24. Row regions within array 20 may form connections to row readout circuitry (not shown) and signal processing circuitry 24 over bus lines (not shown, but serving the function of bus 50). Bidirectional shift register 36 may also control switches in switching circuitry 34 that controls row lines. In this scenario, switching circuitry may readout image signals from a rectangular subarray of pixels from array 20. The readout image signals may be sent to processing circuitry 24 for pixel subarray processing. Since an entire subarray may be readout, more processing options based on entire subarrays (e.g., detecting motion by comparing previous image signals from the same subarray, analyzing the subarray as a whole to find interest points, recognizing designated objects, etc.) are available. The example of readout and processing for a rectangular subarray of pixels from array 20 is merely illustrative, 2-D subarrays consisting of any plurality of pixels may be readout and processed as a subarray group. For example, subarrays may be nonrectangular (e.g., hexagonal), if desired. Hexagonal subarrays may require shorter connections to switching circuitry or processing circuitry.

If desired, any connections may be formed between pixels in array 20 (e.g., single and/or multiple pixel rows and/or single and/or multiple pixel columns) and processing circuitry 24 using connection circuitry (i.e., switching circuitry, bus lines, and shift registers). If desired, multiple pixel rows and/or pixel columns may share a bus line. If desired, subarrays within array 20 may have connections to processing circuitry 24 using connection circuitry formed in a stacked-chip configuration. In such a configuration, a set of photodiodes (e.g., pinned photodiodes) may be used in a time multiplexed mode to perform image sensing operations or be used for signal processing operations. Since the number of vias formed between stacked chips may be limited, switching circuitry 34 may also be operated in a time division multiplexing mode, allowing pixel values from desired pixels to pass through the connection circuitry to processing circuitry 24 and vice versa. Switching circuitry 34 may operate in the time division multiplexing mode for both processed pixel values and unprocessed pixel values.

Figure 4:
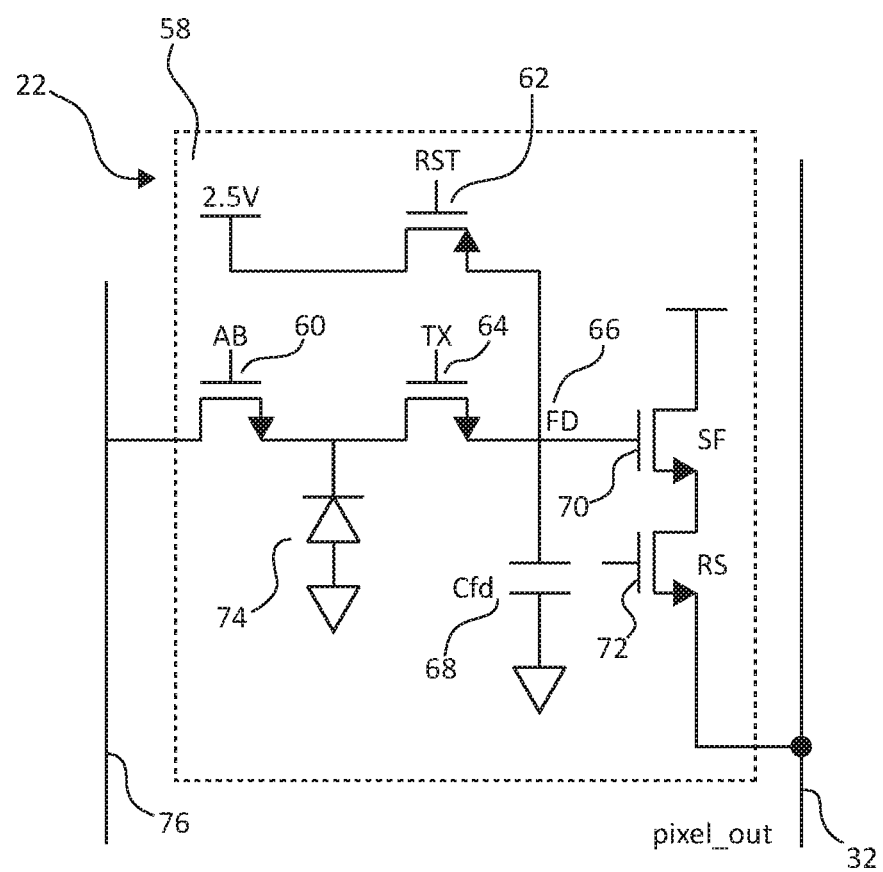
FIG. 4 is a circuit diagram of an illustrative pixel that receives processed pixel signals for storage in accordance with an embodiment.

FIG. 4 is a circuit diagram of pixels 22 having processed pixel value storage capabilities. As shown in FIG. 4, pixel 22 may have power supply 58 (e.g., provided at a supply voltage of 2.5V or at any other desired level), a photosensitive element 74 (e.g., photodiode), and floating diffusion node 66. Photosensitive element 74 may be a pinned charge storage element (e.g., pinned photodiode or PPD) that stores charge when an input has a voltage that is between two thresholds (e.g., 0V and a pin voltage). The pinned charge storage element may store charge when the input voltage is just below the pin voltage. The pinned charge storage element may store the maximum amount of charge when the input voltage is at 0V. Floating diffusion node 66 may exhibit a charge storage capacity as shown by capacitor 68 having capacitance Cfd. Pixel 22 may include reset transistor 62, charge transfer transistor 64, source follower transistor 70, row select transistor 72, and pixel readout line 32.

Before an image is acquired, reset control signal RST may be asserted. This turns on reset transistor 62 and resets floating diffusion node 66 to the supply voltage. The reset control signal RST may then be deasserted to turn off reset transistor 28. After the reset process is complete, transfer control signal TX may be asserted to turn on charge transfer transistor 64. When transfer transistor 64 is turned on, the charge that has been generated by photodiode 74 in response to incoming light is transferred to floating diffusion node 66. Floating diffusion node 66 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits capacitance Cfd shown in capacitor 68 that can be used to store the charge that has been transferred from photodiode 74. The signal associated with the stored charge on node 66 is conveyed to row select transistor 72 by source follower transistor 70.

When it is desired to read out the value of the stored charge (i.e., the value of the stored charge that is represented by the signal at the source S of transistor 70), row-select control signal RS can be asserted. When signal RS is asserted, transistor 72 turns on and a corresponding pixel value that is representative of the magnitude of the charge on floating diffusion node 66 is produced on pixel readout line 32. In a typical configuration, there are numerous rows and columns of pixels such as pixel 22 in array 20. A vertical conductive path such as pixel readout line 32 can be associated with each column of pixels. When signal RS is asserted in a given row, line 32 can be used to route pixel values (e.g., pixel_out) from that row to switching circuitry 34 (see FIG. 1).

Pixel 22 may include an anti-blooming gate 60 (sometimes referred to as write-back control gate) coupled between photodiode 74 and input line 76 (sometimes referred to as write-back input line, digital-to-analog output line). Anti-blooming gate 60 and signal line 76 may perform anti-blooming operations to prevent blooming or over-saturation of charge well 74. Anti-blooming gate 60 and input line 76 may form an input path for conveying processed pixel values from bus 50 to pixel 22 for storage (e.g., while processing step 27 of FIG. 2). For example, the processed pixel value may be passed onto photodiode 74 through gate 60 for storage. This example is merely illustrative. If desired, the processed pixel value may be conveyed to floating diffusion node 66 via charge transfer transistor 64 for storage, or to any other part of pixel 22 for storage. Other input lines coupled between pixel 22 and bus 50 may be used to convey processed pixel values to pixel 22 for storage. For example, the input line may be coupled directly to floating diffusion 66 or to node 66 through an additional transistor (not shown). This stored process pixel value may be read out over line 32 (e.g., while processing step 29 of FIG. 2). In another suitable arrangement, the processed pixel value may be read out over line 76.

FIGS. 3 and 4 are merely illustrative. If desired, the circuitry and pixel configuration of FIG. 3 may be replaced with other forms of switching and register circuitry to move pixel values selectively to either readout circuitry 28 or processing circuitry 24 or other pixel configurations that allow for write-back control (e.g., supply data line and control gate).

Figure 5:
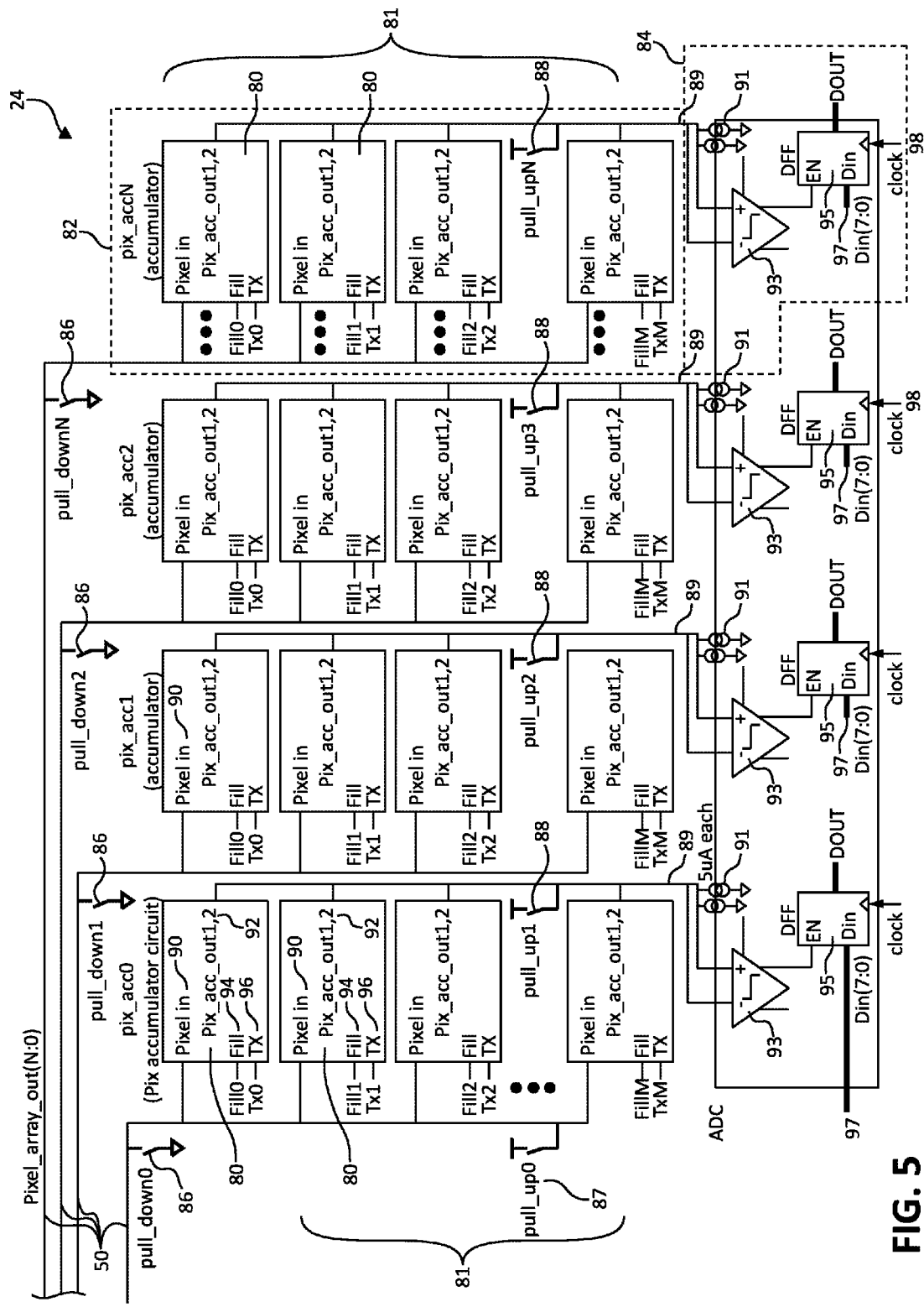
FIG. 5 is an illustrative circuit diagram of on-chip signal processing circuitry that generates processed pixel values in accordance with an embodiment.

FIG. 5 is a circuit diagram showing how signal processing circuitry 24 may include accumulator circuitry for performing processing operations on pixel values generated by array 20. Signal processing circuitry 24 may include a number of accumulator circuits 80 that receive pixel values from switching circuitry 34 through pixel array connection bus 50. A column 82 of accumulators 80 may receive pixel values (e.g., Pixel_array_out for all desired columns) over a shared line of bus 50 (e.g., from the same column of pixels 22 in array 20). A respective pull-down switch 86 and input pull-up switch 87 may be coupled to each conductive line of bus 50 (e.g., to the input of a corresponding column 82 of accumulators 80). When pull-down switch 86 is closed (e.g. enabled), the corresponding accumulator column 82 (e.g., pix_acc0, pix_acc1, . . . , pix_accN) may be coupled to ground to inject a ground voltage or other voltage onto accumulator column 82 through pixel value input 90. The input signal received by pixel value input 90 may be signal Pixel in. When input pull-up switch 87 is closed, the corresponding accumulator column 82 may be coupled to a predetermined voltage source (e.g., a power supply voltage or other voltage) that inhibits additional signal being added into accumulator column 82 through pixel value input 90. Switches 86 and 87 may be omitted if desired.

Each pixel accumulator 80 may have pixel value input 90 (e.g., Pixel in), accumulator output 92 (e.g., Pix_acc_out1, 2), fill control signal input 94 (e.g., Fill), and transfer control signal input 96 (e.g., TX). Each accumulator 80 may receive a corresponding signal input (e.g., Fill0, Fill1, . . . at input 94 and Tx1, Tx2, . . . at input 96). Accumulators 80 in each column 82 may share fill and transfer control signals 94 and 96 to synchronize (either pre-processing or post-processing) pixel value accumulation into each accumulator (e.g., when one accumulator meets data capacity, the control signal may control pixel value movement into the next accumulator and so on). More specifically, when an accumulator 80 is filled to capacity, control signal input 94 may be provided at logic low level to stop inputting pixel values to accumulator 80. Before an entire accumulator column 82 stops receiving input pixel values, output pull up switch 88 may be closed (e.g., enabled). When output pull up switch 88 is closed, the corresponding accumulator column 82 may be coupled to a predetermined voltage source (e.g., a power supply voltage or other voltage) to inject a predetermined voltage onto accumulators in accumulator column 82 that stops additional charge from entering accumulator 80.

Some processing may occur with the configuration of pixel value intake by accumulators 80. Since one accumulator 80 may accumulate pixel values from multiple pixels 22, the accumulated pixel values are effectively binned inside the one accumulator 80. As an example of a processing operation that may be performed by accumulators 80, a 100 pixel by 100 pixel array may be completely transferred to signal processing circuitry 24 for processing. In the process, pixel values from the 100 pixel by 100 pixel array are coupled to the inputs of the plurality of pixel accumulators. With the method discussed above, the pixel values from the square pixel array may be accumulated into a 5 by 5 pixel array of pixel value bins, thereby binning the input pixel values. The 5 by 5 pixel array may be ultimately stored back in array 20 while only occupying a 5×5 pixel area on the array. This allows the pixel array to readout a larger effective field of view, since the 5 by 5 pixel area contains pixel value information from the original 100 by 100 pixel array. Storing lower resolution or windowed images with the process described above may be used during high speed imaging applications or subsequent image analysis.

As another example, accumulators 80 may modulate the number of samples of pixel values taken from each particular pixel 22 (e.g., apply different weights to pixel values from different pixels 22). This technique may be used to implement filter functions (e.g., Gaussian filter). As a further example, a box filter may also be implemented. For the 5×5 pixel array box, accumulators 80 may accumulate five neighboring columns in a five rows from array 20. Subsequently, accumulators 80 may then accumulate the next corresponding 5×5 pixel array box in the same way. In this way, accumulators 80 allow pixel values to be summed without having to use active circuits (e.g., switch capacitor circuits).

Additionally, accumulators 80 may also take the difference between two values (e.g., difference between signal level value and reset signal value). Through this operation, accumulators 80 may also give negative weights to pixel values when filtering. With the option of applying negative weights, accumulators 80 may perform differential operations (e.g., edge detection, Laplacian operations, etc.). Accumulators 80 may compare image values from two sets of pixels (e.g., stored previous pixel image values and current pixel image values).

The length of time when accumulators 80 are receiving pixel values (e.g., when control signal input 94 is provided at a logic high level to fill a photodiode of accumulator 80, then signal input 94 is provided at a logic low level while control signal 96 is provided at a logic high level to transfer charge to the accumulator output, with this operation repeated during the received operation) may be referred to as an accumulation period. Processing operations may take place during the accumulation period or after the accumulation period. For example, after summing or subtracting signals in accumulators 80, analog processing such as difference of Gaussians operations and Laplacian filter operations may be implemented using additional analog processing circuitry. When desired processing is completed, the processed pixel values may be sent to analog-to-digital converter (ADC) 84 to be converted to digital signals for subsequence digital processing.

As a further example, in a different type of operation (e.g., write-back operation), when processed pixel values may be sent back to (e.g., injected into) pixel array 20 through bus 50, transfer control signal input 96 may be provided at a logic high level. Accumulators 80 may have additional control signal inputs that are used in the write-back operation to determine routing paths of the processed pixel values through accumulators 80 to pixel array 20. Each additional control signal input may control a corresponding switch. Each additional signal input may be asserted to close the switch and route the processed pixel values through accumulators 80 using the corresponding routing path enabled by the switch. The processed pixel values may be applied to accumulator outputs 92 and sent to array 20 through accumulator input 90, either directly through a shared line or through pixel accumulator circuitry. When transfer control signal input 96 is provided at a logic low level, write-back operations (e.g., post-processed data to be stored onto array 20) may stop and processing operation (pre-processed data to be processed) may begin.

ADCs 84 in FIG. 5 may convert the analog processed (accumulated) pixel values received from output lines 89 to digital signals DOUT (sometimes referred to herein as digital output DOUT or signal DOUT). The accumulated analog pixel values may be coupled to current sources 91 for proper source follower operation prior to entering ADC 84. As an example, current sources 91 may provide 5 uA each or any other desired current level. Each ADC 84 may include comparator 93 and digital flip-flop 95, for example. The analog accumulated pixel values may be coupled to a first input of comparator 93 whereas a second signal is provided to a second input of comparator 93. Comparator 93 may generate a comparator output to be applied to the En input of flip-flop 95 by comparing the two inputs. Flip-flop 95 may have a digital input signal 97 applied to terminal Din along with a clock signal applied to the flip-flop to generate digital output DOUT. Digital output DOUT may be provided to other digital processing circuitry if desired (not shown in FIG. 5). In addition to performing analog operations at accumulators 80, digital processing circuitry in circuitry 24 may include, for example, difference of Gaussians (DoG) circuitry, Laplacian filter circuitry, circuitry for computing the difference of two images, or any other desired circuitry. Digital output DOUT may also be stored as a digital signal directly in array 20 without subsequent processing if desired.

The accumulators and ADCs shown in FIG. 5 are merely illustrative. In general, any desired type of accumulator and/or ADC in any desired configuration may be used in place of the configuration in FIG. 5. In particular, any desired type of accumulator without active components that can electronically control a flow of electrons that are of the type shown in FIG. 8 may be used to perform the aforementioned operations which may differ from and/or include those performed by accumulators with active components.

Figure 6:
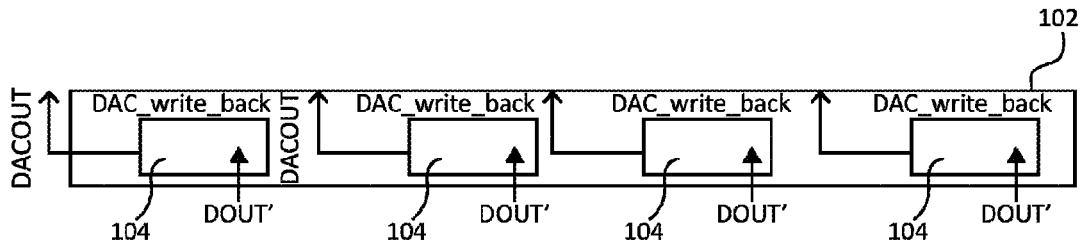
FIG. 6 is a block diagram of illustrative write-back circuitry for transmitting processed pixel values to image pixels for storage in accordance with an embodiment.

FIG. 6 is a block diagram of digital-to-analog converter (DAC) write-back circuitry 102 in signal processing circuitry 24. Digital-to-analog write-back circuitry 102 include a number of DAC circuits 104 (sometimes referred to as DAC_write_back) coupled to a corresponding ADC 84 (e.g., each DAC may process pixel values operated on by a corresponding column 82 of pixel accumulators 80 and captured by a corresponding column of pixels 22). Each DAC write-back circuit 104 may receive digital inputs DOUT' and enable signal EN sent from comparator 93 to flip-flop 95. Signal DOUT' may be the same signal as digital signal DOUT of FIG. 5 or may be an output of digital processing circuitry that performs digital processing operations on signal DOUT of FIG. 5. DAC write-back circuit 104 may convert the input value DOUT' to a corresponding analog signal DACOUT. Signal DACOUT may be provided to pixel 22 for storage (e.g., DACOUT may be an analog version of the processed pixel value suitable for storage on pixels 22).

As an example, the analog signal DACOUT, which is ultimately stored in array 20 may be of intermediate images. In this scenario, array 20 may serve as a frame buffer. The intermediate images may be filtered images or images containing identified image information (e.g., edge information or interest points). Metadata may be generated from the identified image information. Subsequent processing steps may include processing based on the gathered information (e.g., calculating corresponding descriptor associated with the interest points, object matching or object recognition based on edge information and interest points, etc.). Using array 20 as a frame buffer may also be used for LED flicker mitigation applications. All or some of pixels 22 in array 20 may be periodically refreshed to reset the array. After refreshing, new processed pixel values may be stored or new light signals may be collected in array 20.

Figure 7:
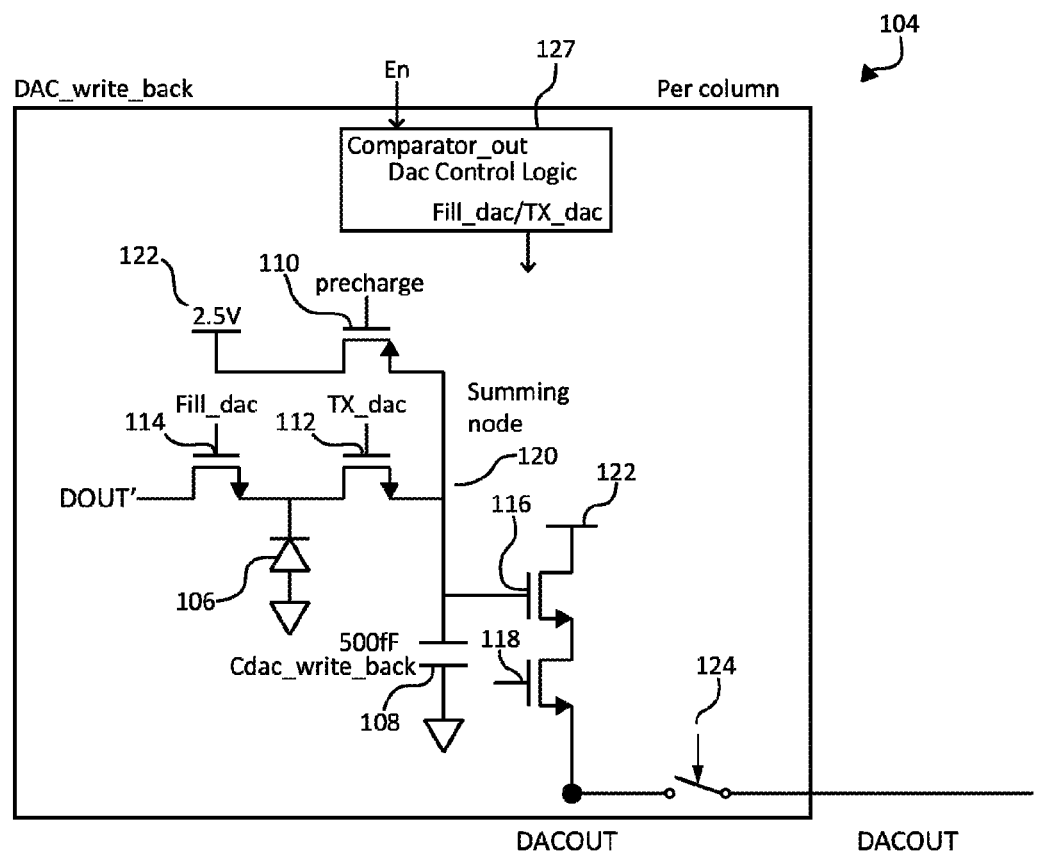
FIG. 7 is a circuit diagram of illustrative digital-to-analog converter circuitry in write-back circuitry of the type shown in FIG. 6 in accordance with an embodiment.

FIG. 7 shows a circuit diagram of a possible configuration for DAC write-back circuit 104 shown in FIG. 6. DAC write-back circuit 104 may receive digital input DOUT' and may produce a corresponding output DACOUT using enable signal En corresponding to enable signal EN sent from comparator 93 to flip-flop 95. DAC write-back circuit 104 may include charge well (storage) element 106 (e.g., photodiode), DAC write-back capacitor 108 (e.g., with capacitance 500 fF), precharge transistor 110, charge transfer transistor 112, fill transistor 114, source follower transistor 116, row select transistor 118, summing node 120, power supply 122 (e.g., provided at a supply voltage of 2.5V). These components are analogous to the components of pixel 22 shown in FIG. 4. Additionally, DAC write-back circuit 104 may have write-back switch 124 to control the output DACOUT and to disable the DAC write-back circuit when needed (e.g., pixel values are being accumulated in accumulators 80 and no data to write-back to array 20).

Initially, the supply voltage of power supply 122 may be applied to summing node 120 through precharge transistor 110. Individual or multiple bits from digital input DOUT' may then input a signal through transistors 114 and 112 piecewise, respectively, allowing photodiode 106 to transfer charge to summing node 120 that is indicative of the single bit value (e.g., 0 or 1) or multiple bit values (e.g., 00, 01, 10, 11, etc.). The bit values at summing node 120 are buffered by source follower transistor 116 and used to generate output DACOUT. Output DACOUT value is written back into the pixel array that corresponds to digital input DOUT'. Digital input DOUT' may include multiple bits. Multiple write-backs into the pixel array may be needed to represent all of the bits of Digital input DOUT'. As an input to Dac Control Logic 127, enable signal En may determine when the control signals Fill_dac and TX_dac are active to transfer charge to summing node 120. At the beginning of an analog to digital signal conversion of an analog value stored at accumulator 80, enable signal En may be active and allow accumulation of charge at storage element 106 though transistors 114 and 112. A period of time during which the analog to digital signal conversion takes place to convert an analog value into a corresponding digital value may be referred to as the analog to digital signal conversion time. The analog to digital signal conversion time, before enable signal En is turned off, is indicative of the digital value. Summing node 120 contains the corresponding analog value indicative of a resultant ADC output at the time enable signal En is turn off. DACOUT may correlate to the corresponding value of summing node 120 after the value is conveyed to transistor 118 through the gate terminal of transistor 116. The analog value is then written-back (e.g., stored again in array 20) as DACOUT, allowing for summing node 120 to precharge again to convert the next piece of digital input DOUT'. Switch 124 may control the transition of pieces of analog data to accumulators 81 and subsequently array 20.

Figure 8:
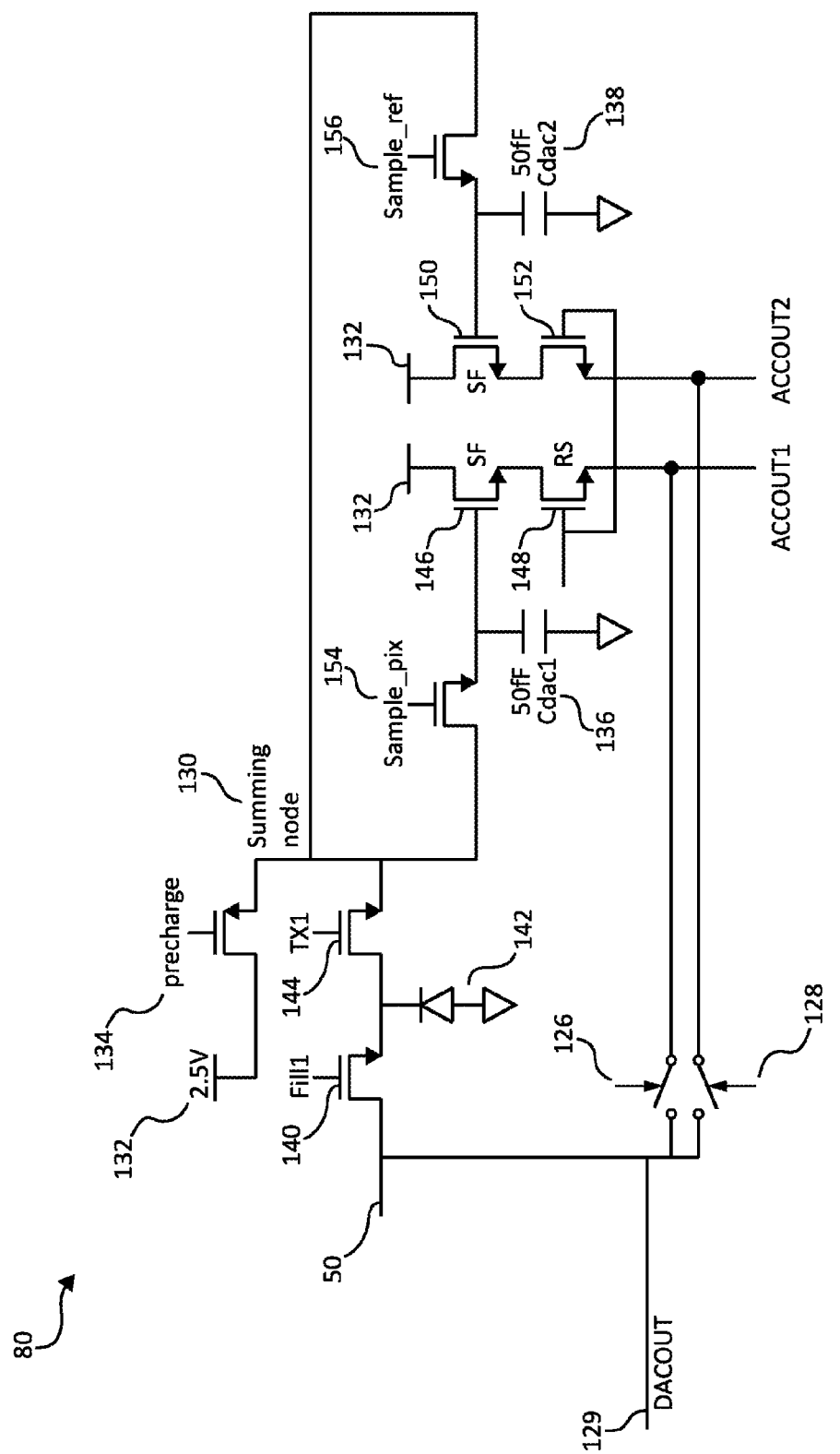
FIG. 8 is a circuit diagram of an illustrative pixel accumulator circuitry of the type shown in FIG. 5 in accordance with an embodiment.

FIG. 8 shows a circuit diagram of a possible configuration of pixel accumulator 80 shown in FIG. 5. During accumulation operations, pixel values received over a line of the pixel array connection bus 50 may be used as the input signal for accumulator 80, whereas accumulator outputs ACCOUT1 and ACCOUT2 may be provided as output signals to send to comparator 93 in ADC 84 (e.g., over output line 89). The output of a corresponding DAC 104 may be coupled to accumulator 80 as shown by input 129. Input 129 of accumulator 80 coupled to the output of DAC 104 may be temporarily disabled by opening (e.g., disabling) switch 124 in FIG. 5 or opening (e.g., disabling) write-back switches 126 and 128. Write-back switches 126 and 128 may be controlled by control signal inputs of accumulator 80.

Similar to the DAC write-back operation, summing node 130 may be pre-charged to a supply voltage (e.g., 2.5V) of power supply 132 through enabling precharge transistor 134. Pixel array connection bus 50 may input an input pixel value into accumulator 80. The input pixel value (e.g., charge) may be stored in charge storage element 142 (e.g., a photodiode) by enabling fill gate 140. Charge storage element 142 may be a pinned charge storage element (e.g., pinned photodiode or PPD) that stores charge when an input has a voltage that is between two thresholds (e.g., 0V and a pin voltage). The pinned charge storage element may store charge when the input voltage is just below the pin voltage.

The pinned charge storage element may store the maximum amount of charge when the input voltage is at 0V. The pinned storage element may use either electrons or holes as carriers with opposite polarity requirements to store the two types of carriers and transferring them to other storage regions. The pinned storage element may perform operations (e.g., collect charge that is proportional to the input voltage and transfer the collected charge to a processing or storage node) that otherwise would require active components such as switch capacitor circuits and potentially area-intensive logic gates.

The charge stored in charge well 142 may be transferred to summing node 130 by enabling transfer gate 144. Summing node 130 may be connected to capacitor 136 (e.g., with a capacitance of 50 fF) or capacitor 138 (e.g., with a capacitance of 50 fF) by enabling sample pixel transistor 154 or sample reference transistor 156, respectively. A portion of the circuit containing capacitor 136 may provide accumulator output ACCOUT1 through source follower transistor 146 and row select transistor 148. A second portion of the circuit contain capacitor 138 may provide accumulator output ACCOUT2 through source follower transistor 150 and row select transistor 152. Capacitors 136 and 138 may have the same or different capacitances. Based on the capacitance of the capacitors, it may take multiple samples to capture the desired pixel values. As an example, with a capacitance of 50 fF, a 5000 electron full well, pixel input signal near 0V, it may take 25 samples to generate a 0.4V signal on the capacitor.

As an example of processing, all of the input pixel values may be collected at capacitor 136 and transferred to ACCOUT1. ACCOUT2 may provide a reference by using the supply voltage of power supply 132 to charge capacitor 138 for a set number of samples. Alternatively, the reference may be provided by an external source (e.g., image data, scalar or vector information). As a further example of processing, alternating pixel value segments may be sent alternately to capacitors 136 and 138 and later compared with one another in comparator 93 of FIG. 5. Multiple pixel value segments may also be binned together by sampling a desired bin of pixel values.

During write-back operation, signals DACOUT, ACCOUT1, and ACCOUT2 may be used as inputs to accumulator 80 by enabling write-back switches, 124, 126, and 128, respectively. Write-back switches 124, 126, and 128 may control the routing path of the processed pixel values through accumulator 80 and back to pixel array 20. A line of pixel array connection bus 50 may convey an output signal of accumulator 80 to pixel array 20 during write-back. As an example of operation, pixel signals may be processed (e.g., binned) through one or multiple accumulators, then outputted directly as ACCOUT1 or ACCOUT2 to be stored in array 20. If subsequent digital or analog processing is desired, accumulator outputs ACCOUT1 and ACCOU2 may not be stored and may be sent to ADC 84 and DAC write-back 102, with processing steps taking place in any of the intermediate steps. Ultimately, the processed signal may be converted to analog DACOUT and written-back to and stored in array 20. However, the processed signal, if desired may also be stored as a digital signal without traversing DAC write-back 102.

The accumulator configuration and operation shown in FIG. 8 are merely illustrative. In general, any desired type of accumulator in any desired set of operations may be used in place of those discussed in FIG. 8. In particular, any desired type of accumulator without active components that can electronically control a flow of electrons that are of the type shown in FIG. 8 may be used to perform the aforementioned operations which may differ from and/or include those performed by accumulators with active components.

In general, charge storage wells may suffer from non-linear characteristics when storing input signals (e.g., input pixel values). The non-linear characteristics relate to the non-linear relationship between voltage and charge in the charge storage wells at different input signal voltage levels. Since non-linear systems may be more difficult to characterize, it may be desired to avoid them. This problem may be solved by implementing compensation circuitry. The compensation circuitry may include a feedback system parallel to charge storage circuitry to compensate for the non-linear relationship through a feedback loop.

Figure 9:
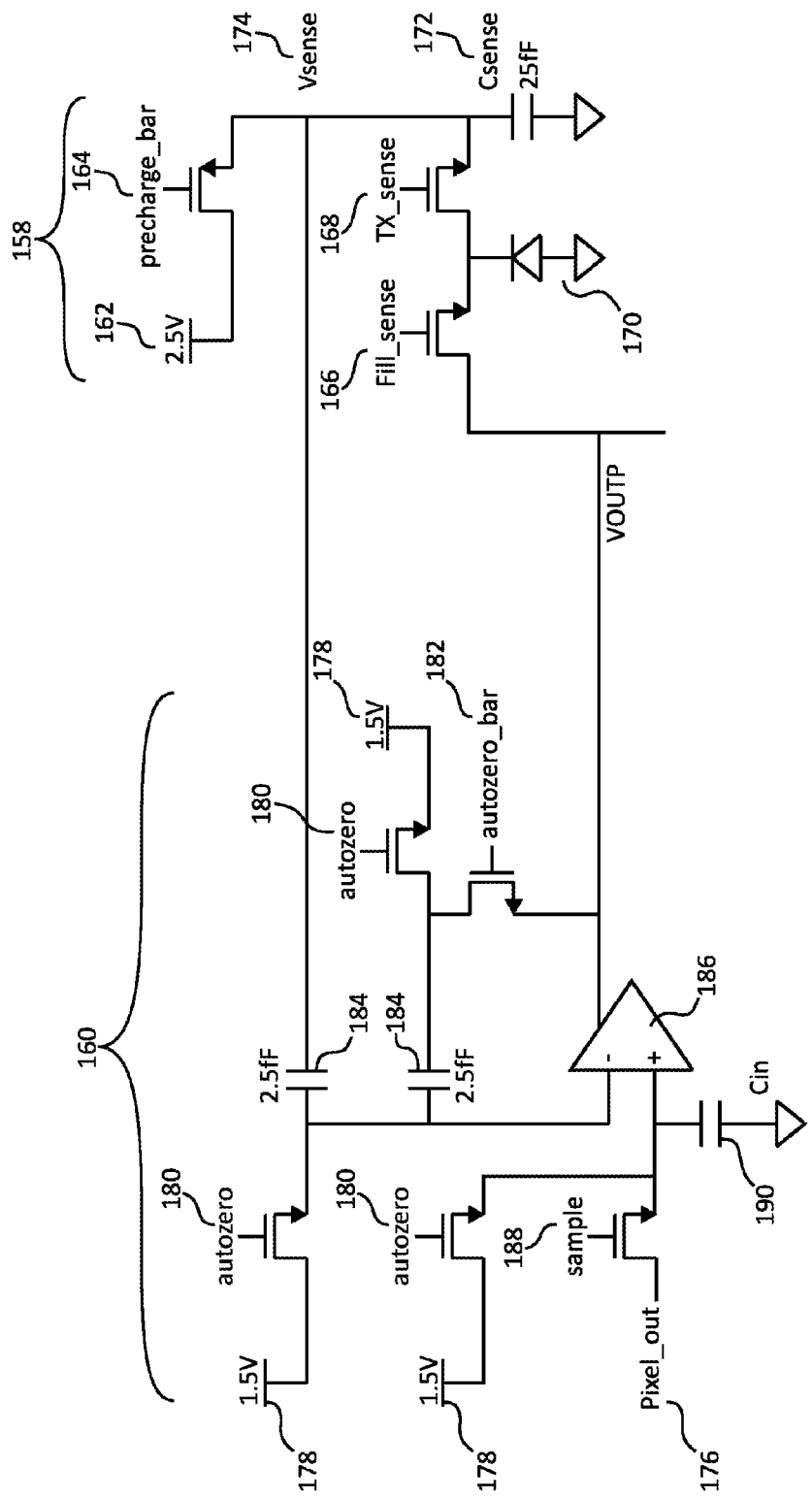
FIG. 9 is a circuit diagram of illustrative pixel signal compensation circuitry in accordance with an embodiment.

FIG. 9 shows such a type of compensation circuitry (e.g., pre-emphasis or shadow circuitry). The compensation circuitry includes a control system (e.g., a feedback system) in addition to a portion of accumulator 80 as shown in FIG. 8 or any similarly configured systems (e.g., DAC write-back 102 shown in FIG. 7), if feedback control is desired. The partial DAC write-back is shown in portion 158. Portion 158 may include power supply 162 (e.g., with a supply voltage of 2.5V), precharge transistor 164, fill transistor 166, transfer transistor 168, charge storage well 170, sense capacitor 172 (e.g., with a capacitance of 25 fF), and sensing node 174, all of which have their analogous counterparts in FIG. 8. The feedback system is shown in portion 160 is the feedback portion. Portion 160 may receive pixel value input 176 as a first input and the voltage of sensing node 174 as a second input. Portion 160 may output a compensated output signal VOUTP to accumulators 80 and continue operations that have previously been discussed.

Portion 160 may contain power supply 178 with a supply voltage (e.g., 1.5V), autozero transistors 180, secondary autozero transistor 182, sample transistor 188, operation amplifier (OPAMP) 186, and input capacitor 190. Pixel value input 176 may be coupled to the second (positive) terminal of OPAMP 186 by enabling sample transistor 188. The supply voltage of power supply 178 may be coupled to either terminal of operation amplifier 186 by enabling autozero transistors 180. By doing so, pixel value input 176 that is coupled to the first terminal may be reset by the supply voltage. A similar operation may occur for the voltage of sensing node 174 transferred across capacitor 184 (e.g., with a capacitance of 2.5 fF) for a first (negative) terminal of OPAMP 186, where voltage at the negative terminal may be reset to the supply voltage. As an example of operation, when pixel value input 176 and sensing node signal are at the positive and negative terminals of OPAMP 186, respectively, OPAMP 186 may output compensated signal VOUTP corresponding to pixel value input 176. VOUTP may also be reset to the supply voltage by enabling both autozero transistor 180 and secondary autozero transistor 182.

As an example, the feedback system implemented in the compensation circuitry may be used to linearize the conversion of input voltage into a charge given a capacitance. The compensation circuitry and operation shown in FIG. 9 are merely illustrative. In general, any desired type of control system or any type of feedback system for any non-ideal behavior in any analogous systems may be used in place of those discussed in FIG. 9.

Figure 10:
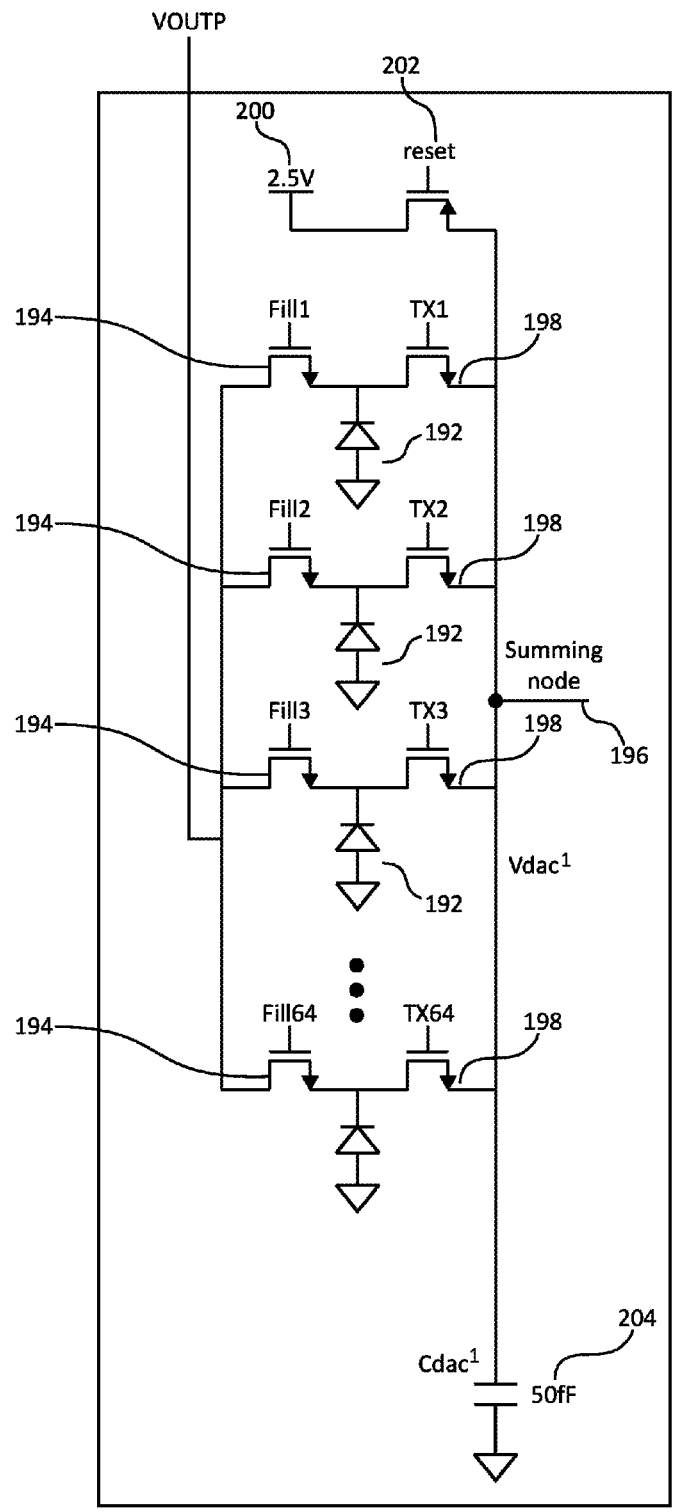
FIG. 10 is a circuit diagram of pixel accumulator circuitry that may be coupled to compensation circuitry of the type shown in FIG. 9 in accordance with an embodiment.

FIG. 10 shows an example of accumulator circuitry that may be coupled to the compensation circuitry shown in FIG. 9. The accumulator circuitry may have a plurality of charge storage wells 192 that may be coupled to compensated output VOUTP by enabling corresponding fill gates 194.

Charge stored in charge storage wells 192 may be transferred to summing node 196 by enabling transfer gates 198. Summing node 196 may be reset by enabling reset transistor 202 to couple summing node 196 with a supply voltage (e.g., 2.5V) of power supply 200. Summing node 196 is coupled to a common capacitor 204 to control the charge flow onto the node. Each set of charge storage well 192, fill gate 194, and transfer gate 198 may be enabled in a controlled manner by enabling/disabling a corresponding set of control signals.

The accumulator circuitry and operation shown in FIG. 10 are merely illustrative. In general, any desired type of accumulator its corresponding operation may be used in place of those discussed in FIG. 10.

Figure 11:
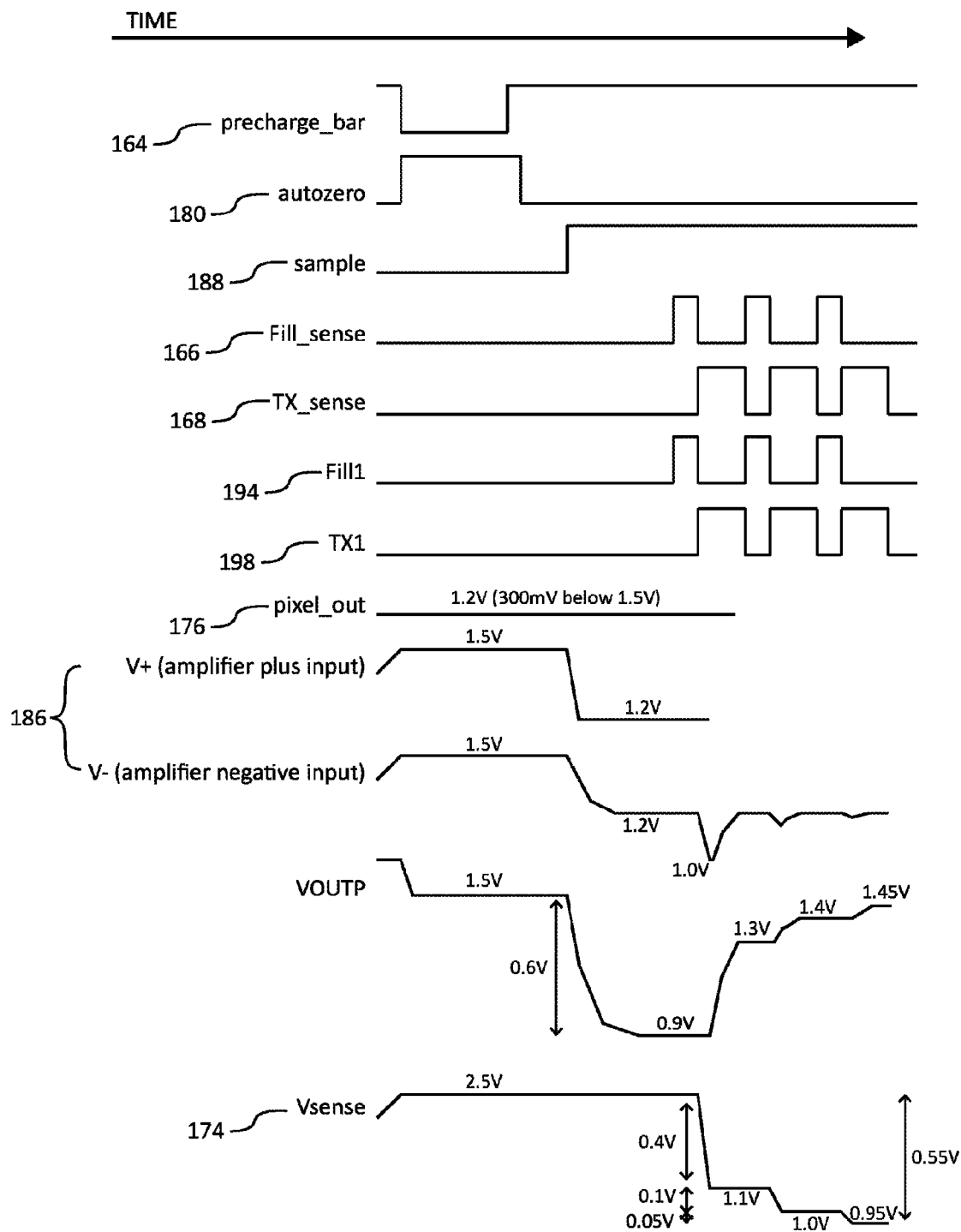
FIG. 11 is an illustrative timing diagram for operating an image sensor having compensation circuitry of the type shown in FIG. 9 and pixel accumulator circuitry of the type shown in FIG. 10 in accordance with an embodiment.

FIG. 11 shows a timing diagram demonstrating a possible operation mode using circuitry discussed in FIGS. 9 and 10. The first seven signals correspond to control signals controlling transistor gates of the corresponding transistors 164, 180, 188, 166, 168, 194, and 198, respectively. Pixel_out signal corresponds to the pixel value input 176. V+ and V− correspond to the positive and negative terminals of OPAMP 186. Signals VOUTP and sensing node 174 are also shown at the bottom. The timing diagram shown in FIG. 11 are merely illustrative. In general, any other corresponding operation mode may be used in place of those discussed in FIG. 11.

Figure 12:
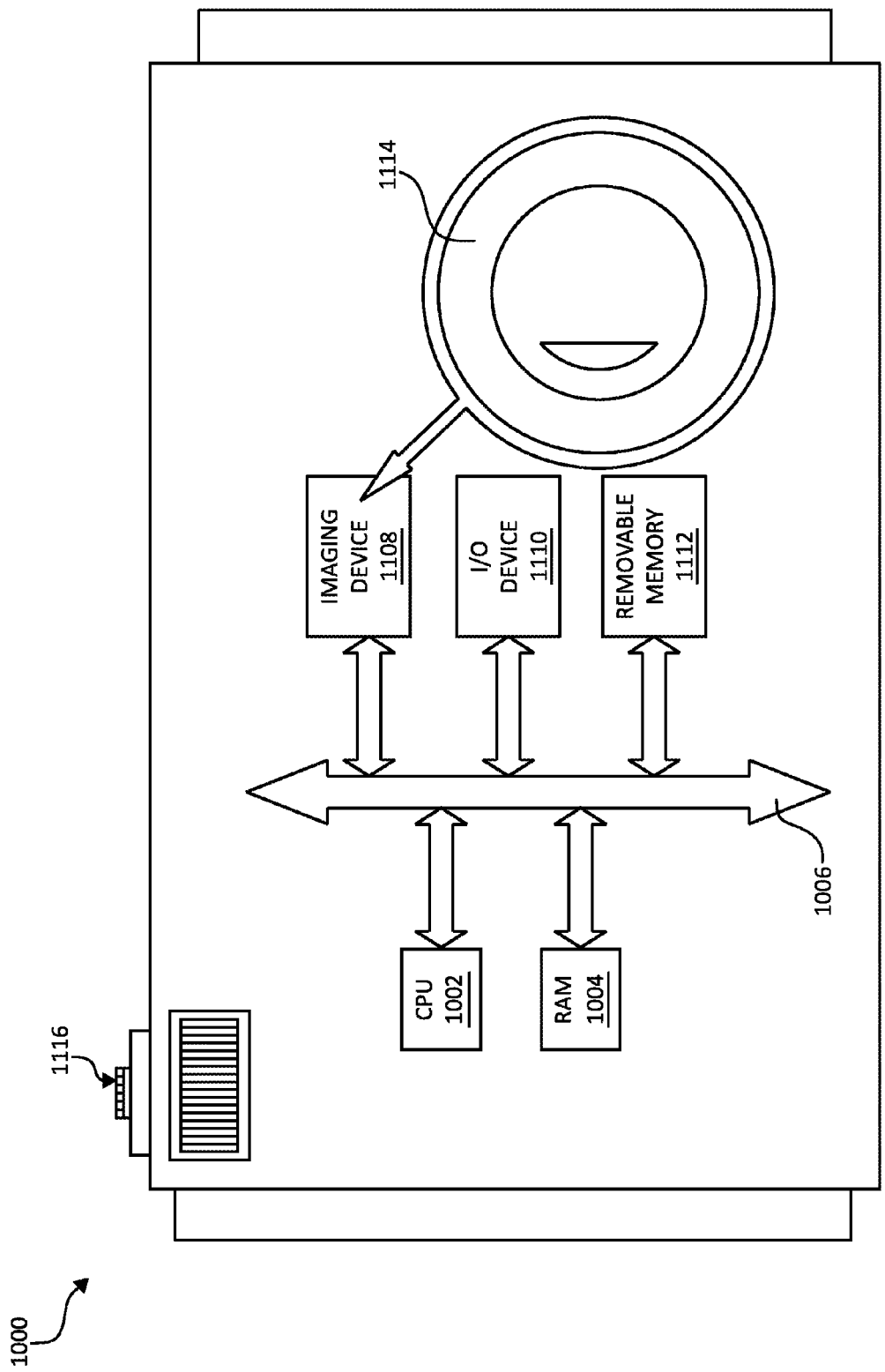
FIG. 12 is a block diagram of a processor system that may employ the embodiments of FIGS. 1-11 in accordance with an embodiment of the present invention.

FIG. 12 is a simplified diagram of an illustrative processor system 1000, such as a digital camera, which includes an imaging device 1008 (e.g., the camera module) employing an imager having image pixels as described above in connection with FIGS. 1-11. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 1000, for example a digital still or video camera system, generally includes a lens 1114 for focusing an image onto one or more pixel array in imaging device 1008 when a shutter release button 1116 is pressed and a central processing unit (CPU) 1002 such as a microprocessor which controls camera and one or more image flow functions. Processing unit 1102 can communicate with one or more input-output (I/O) devices 1110 over a system bus 1006. Imaging device 1008 may also communicate with CPU 1002 over bus 1006. System 1000 may also include random access memory (RAM) 1004 and can optionally include removable memory 1112, such as flash memory, which can also communicate with CPU 1002 over the bus 1006. Imaging device 1008 may be combined with the CPU, with or without memory storage on a single integrated circuit or on a different chip. Although bus 1006 is illustrated as a single bus, it may be one or more busses, bridges or other communication paths used to interconnect system components of system 1000.

Various embodiments have been described illustrating systems and methods for image sensors with image pixels having processed signal storage capabilities. Image pixels that have signal storage capabilities and accompanying support circuitry may perform faster and more efficient signal processing and storage than in systems with image pixels without processed signal storage capabilities.

The image sensor may include an array of image sensor pixels, some or all of which have processed pixel value storage capabilities. The image sensor may include switching circuitry, signal processing circuitry, and communication paths. Photodiodes within the pixels may generate pixel values in response to image light. During pixel value readout, column lines may carry pixel values from the array to switching circuitry. The switching circuitry may route the pixel values to signal processing circuitry over the communication paths. The signal processing circuitry may process the pixel values to generate processed pixel values. The signal processing circuitry may send the processed pixel values back to the pixel array to be stored in some or all of the pixels within the array. Pixels may have a control gate and a write-back input line to allow for the processed pixel values to be sent back to the array and stored in the pixels.

The signal processing circuitry may include accumulators, compensation circuitry, analog-to-digital converters, digital-to-analog converters, and other signal analog and/or digital processing circuitry. The generated pixel values may be sent over communication paths from switching circuitry to accumulators. The accumulators may use compensation circuitry to compensate for non-linear characteristics of charge storage wells. The accumulators may accumulate the pixel values and send the post-accumulation values (e.g., processed analog pixel values) to analog-to-digital converters. The analog-to-digital converter may convert the processed analog pixel values to processed digital pixel values. The processed digital pixel values may be sent to other digital processing circuitry, if desired. After the optional digital processing, the processed digital pixel values may be sent to digital-to-analog converters to be converted back into analog signals. The signal processing circuitry may output the final processed analog signals and ultimately send the signals back to the array for storage.

In one suitable arrangement, signal accumulation operations performed by the accumulators may include filtering operations (e.g., Gaussian filters, box filters) that include weighted summing operations. In another suitable arrangement, the accumulators may apply other processing operations (e.g., Laplacian operations, edge detection operations, etc.) that include weighted subtraction operations. Ultimately, higher-level processing (e.g., object recognition) may be performed.

In accordance with any of the above arrangements, the pixels with storage capabilities may store processed signals in any part of the pixels (e.g., photosensitive regions, floating diffusion nodes, etc.). The pixels may be covered by light shielding structures (e.g., mechanical shutter, buried light shield, etc.) to temporarily or permanently prevent incoming light from corrupting stored process pixel values.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor, comprising:
   a plurality of image sensor pixels that generates a pixel value, wherein a given one of the image sensor pixels comprises a charge storage region; and
   processing circuitry that generates a processed pixel value based on the generated pixel value, wherein the given image sensor pixel is configured to store the processed pixel value on the charge storage region, wherein the processing circuitry comprises an accumulator, wherein the accumulator comprises a pinned charge storage element, and wherein the accumulator stores the pixel value and generates an accumulated pixel value based on the stored pixel value.

2. The image sensor defined in claim 1, wherein the charge storage region comprises a photodiode.

3. The image sensor defined in claim 2 further comprising:
a write-back input line; and
a control gate, wherein the write-back input line is coupled to a first terminal of the control gate and the photodiode is coupled to a second terminal of the control gate.

4. The image sensor defined in claim 3, wherein the control gate comprises an anti-blooming transistor.

5. The image sensor defined in claim 1, wherein the charge storage region comprises a floating diffusion node.

6. The image sensor defined in claim 5 further comprising:
a write-back input line; and
a control gate, wherein the write-back input line is coupled to a first terminal of the control gate and the floating diffusion node is coupled to a second terminal of the control gate.

7. The image sensor defined in claim 1, wherein the pixel value is generated in response to light, further comprising:
a light shielding structure that covers the charge storage region.

8. The image sensor defined in claim 1, wherein the plurality of image sensor pixels and the processing circuitry are both formed on a shared integrated circuit substrate.

9. The image sensor defined in claim 1, wherein the processing circuitry further comprises compensation circuitry that is configured to compensate for a non-linear relationship between voltage and capacitance in a charge storage well on the accumulator.

10. The image sensor defined in claim 9, wherein the processing circuitry further comprises:
analog-to-digital conversion circuitry, wherein the analog-to-digital conversion circuitry receives the accumulated pixel value and generates a corresponding processed digital signal; and
digital-to-analog conversion circuitry, wherein the digital-to-analog conversion circuitry receives the processed digital signal and generates the processed pixel value based on the processed digital signal.

11. A method of operating an image sensor that includes an array of image sensor pixels, switching circuitry, and processing circuitry, the method comprising:
with the array of image sensor pixels, generating pixel values;
with the switching circuitry, routing the generated pixel values from the array of image sensor pixels to accumulator circuitry in the processing circuitry;
with the accumulator circuitry in the processing circuitry, generating processed pixel values based on the pixel values generated by the array of image sensor pixels; and
at the array of image sensor pixels, storing the processed pixel values.

12. The method defined in claim 11, wherein the processing circuitry comprises a pinned photodiode and wherein the pixel values comprise first and second sets of pixel values, the method further comprising:
with the processing circuitry and the pinned photodiode, performing a weighted addition operation on the first set of pixel values; and
with the processing circuitry and the pinned photodiode, performing a weighted subtraction operation on the second set of pixel values.

13. The method defined in claim 11 further comprising:
with the processing circuitry, generating metadata that identifies interest points in an imaged scene from the generated pixel values; and
with the processing circuitry, performing object recognition operations using the generated metadata.

14. The method defined in claim 11, further comprising:
with the processing circuitry, reading out a plurality of pixel values from a plurality of image sensor pixels within the array of image sensor pixels, wherein the plurality of image sensor pixels forms a subarray within the array of image sensor pixels.

15. The method defined in claim 11 further comprising:
with the processing circuitry, comparing a first plurality of pixel values from a first plurality of image sensor pixels within the array of image sensor pixels with a second plurality of pixel values from a second plurality of image sensor pixels within the array of image sensor pixels, wherein the second plurality of pixel values are previously processed pixel values stored at the array of image sensor pixels.

16. The method defined in claim 11 further comprising:
refreshing the processed pixel values stored at the array of image sensor pixels.

17. A system, comprising:
a central processing unit;
memory;
a lens;
input-output circuitry; and
an imaging device, wherein the imaging device comprises:
an array of image sensor pixels that generates pixel signals;
accumulator circuitry that receives the pixel signals and that performs processing operations on the pixel signals to generate processed pixel signals;
a communications path, wherein the accumulator circuitry conveys the processed pixel signals to the array of image sensor pixels for storage on at least one image sensor pixel in the array over the communications path;
readout circuitry that is separated from the accumulator circuitry, wherein the readout circuitry is configured to receive the generated pixel signals; and
switching circuitry configured to selectively route the generated pixel signals to the accumulator circuitry.

18. The system defined in claim 17, wherein the switching circuitry is coupled to the communications path, the readout circuitry, and the array and wherein the imaging device further comprises:
shift register circuitry, wherein the shift register circuitry is configured to control the switching circuitry to route the generated pixel signals to one or both of the circuitry and the readout circuitry.

* * * * *